United States Patent [19]

Casey

[11] Patent Number: 4,545,356
[45] Date of Patent: Oct. 8, 1985

[54] LIQUIFIED PETROLEUM GAS CARBURETOR

[75] Inventor: Gary L. Casey, Troy, Mich.

[73] Assignee: Allied Corporation, Morris Township, Morris County, N.J.

[21] Appl. No.: 615,653

[22] Filed: May 31, 1984

[51] Int. Cl.$^4$ ............................................. F02B 43/00
[52] U.S. Cl. .................................. 123/527; 123/577;
123/1 A; 48/189; 261/50 A
[58] Field of Search ............... 123/525, 526, 527, 575,
123/576, 577, 1 A; 48/180.1, 189.3, 189.2;
261/50 A

[56] References Cited

U.S. PATENT DOCUMENTS

| | | | |
|---|---|---|---|
| 2,073,276 | 3/1937 | Ensign | 123/527 |
| 2,361,761 | 10/1944 | Gerson | 261/11 |
| 2,381,304 | 8/1945 | Merrill | 123/527 |
| 2,409,611 | 10/1946 | Bodine | 123/527 |
| 2,696,714 | 12/1954 | Huges | 62/1 |
| 2,821,843 | 2/1958 | Mengelkamp et al. | 123/527 |
| 3,067,020 | 12/1962 | Holzapfel | 48/184 |
| 3,593,694 | 7/1971 | Hilborn | 123/119 R |
| 3,960,126 | 6/1976 | Shinoda | 123/120 |
| 3,986,846 | 10/1976 | Bivins, Jr. | 48/180 C |
| 4,063,905 | 12/1977 | Johnson et al. | 48/180 R |
| 4,347,824 | 9/1982 | Pierson | 123/527 |
| 4,351,309 | 9/1982 | Selvidge et al. | 123/527 |
| 4,370,969 | 2/1983 | Zarrelli et al. | 123/525 |

FOREIGN PATENT DOCUMENTS 88199 9/1983 European Pat. Off. ............ 123/527

Primary Examiner—Ethel R. Cross
Attorney, Agent, or Firm—Russel C. Wells; Markell Seitzman

[57] ABSTRACT

A liquified petroleum gas carburetor (12) receiving LPG as a liquid and through a pair of pressure regulators (20, 30) and a heat exchanger (22) reducing the liquid to a vapor for ingesting into the engine (8). The heat exchanger (22) is mounted integral with the carburetor (12) and is contiguous with the intake manifold (24) thereby providing a large thermal mass for elevating the temperature of the LPG. Connected for synchronous movement are the fuel metering valve (40) and the air metering valve (10) for each carburetor bore. The fuel metering valve moves in response to the air metering valve (10). A vacuum pressure control (66) is shown to maintain a variable fuel/air ratio in response to engine requirements.

10 Claims, 6 Drawing Figures

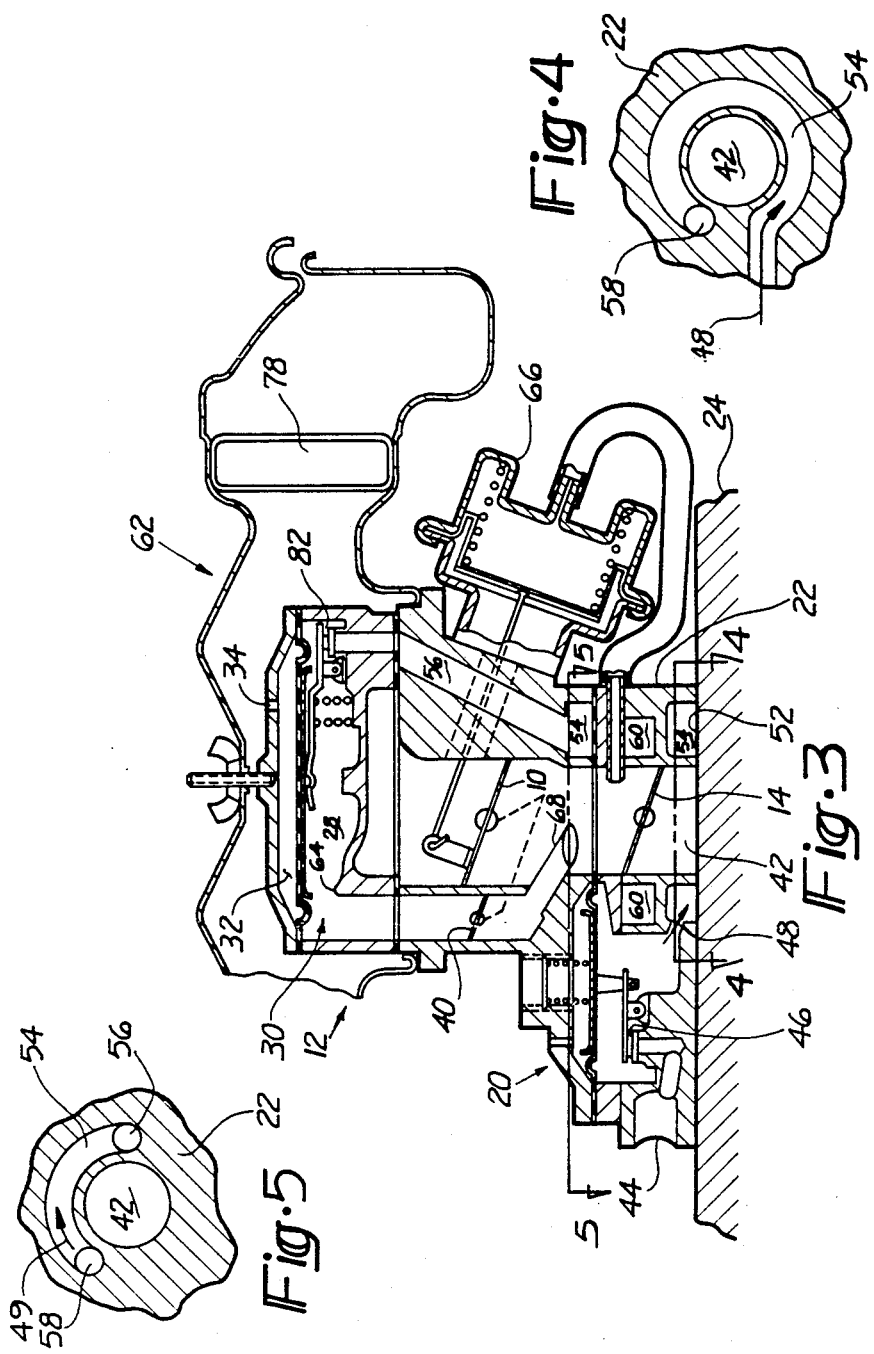

LIQUIFIED PETROLEUM GAS CARBURETOR

This invention relates to fuel charge forming devices for internal combustion engines and in particular to an air valve carburetor for Liquified Petroleum Gas or similar fuels.

PRIOR ART

U.S. Pat. No. 3,960,126 issued on June 1, 1976 to Kazuo Shinoda and entitled "Pressure Regulator of Liquefied-Gas Fuel System For Internal Combustion Engines" describes a pressure regulator to be used to change air fuel ratios between two valves in accordance with the engine load. The system in which the regulator is used has an air valve responding to air intake to the engine to control a fuel metering valve.

U.S. Pat. No. 3,067,020 issued on Dec. 4, 1962 to George L. Holzapfel and entitled "Carburetor For Liquefied Gaseous Fuels" describes a single stage pressure regulator for receiving liquefied gaseous fuel and discharging the fuel into an engine. An air valve controls the movement of a fuel discharge needle valve from which the fuel is sprayed into the engine.

The problems which remained after the inventions described in the aforementioned prior art are solved by the following system. In the preferred embodiment, Liquefied Petroleum Gas, hereinafter called LPG, is stored in a fuel tank in an equilibrium state wherein the fuel is liquid. This state is at a high pressure which is a function of the ambient temperature of the fuel tank. Fuel is transferred through a fuel line from the tank to inlet tube of the engine through a first pressure regulator which reduces the fuel pressure to a level reducing the boiling point of the fuel to a temperature that is lower than any ambient temperature that the sytem will experience. Such a temperature is minus forty degrees Centigrade wherein the pressure is 0.35 Kg/cm² or 5 psig.

At the output of the first regulator the fuel is still liquid and is passed through a heat exchanger or vaporizer to convert the fuel to a vapor. The vaporized fuel is supplied to a second pressure regulator to reduce the fuel pressure to a level slightly below ambient. The reduced pressure fuel is then metered into the inlet tube of the engine.

The structure of the preferred embodiment is a carburetor wherein the first pressure regulator, the heat exchanger, the second pressure regulator and the metering valve are integral with the heat exchanger and mounted contiguous with the intake manifold. In the preferred embodiment, the system is a mono-fuel system able to meter the various LPG fuels and does not meter conventional fuels for internal combustion engines.

The preferred embodiment and other objects will be best undertood from the following detailed description taken in conjunction with the drawings.

IN THE DRAWINGS

FIG. 3 is a drawing of the integral carburetor;

FIG. 4 is a sectional view along line 4—4 of FIG. 3;

FIG. 5 is a sectional view along line 5—5 of FIG. 3; and

DETAILED DESCRIPTION

Figure 1:
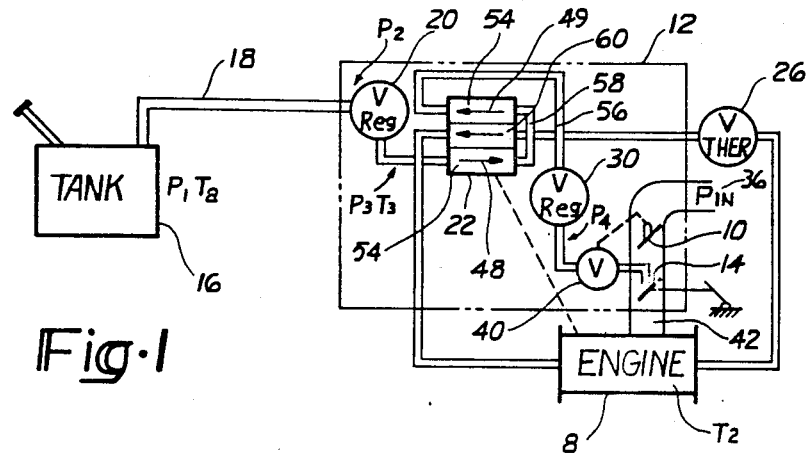
FIG. 1 is a schematic diagram of the fuel system incorporating the preferred embodiment.

Referring to the Figures by characters of reference there is illustrated in FIG. 1 a schematic diagram of the present invention. Although the preferred embodiment of the invention is described in a monofuel system wherein the sole fuel to drive the engine 8 is LPG, the principles of the invention may be used in a multiple fuel engine wherein other fuels such as conventional gasoline may, in the alternative, be used to fuel the engine. The term LPG includes butane, propane, pentane, etc.

As in all carburetors 12, the fuel must be mixed with a proper amount of air in order to operate the engine 8. The air is metered by a first metering valve 10 which responds to the pressure on either side thereof to provide the proper amount of air. The downstream pressure is controlled by a throttle valve or blade 14 operated in response to the desired engine requirements.

The fuel is stored as a liquid in a sealed tank 16 at a pressure $P_1$ at a temperature $T_a$. The temperature is typically the ambient temperature of the environment wherein the fuel is stored. The fuel is removed from the tank 16 by means of a fuel line 18 to the carburetor 12 mounted on the engine 8. The fuel enters the carburetor 12 at a first pressure regulator 20 which is integral with the carburetor 12. The input pressure to the first pressure regulator 12 is $P_2$ which is less than $P_1$ by the pressure drops in the fuel line 18 from the tank 16 to the first pressure regulator 20.

At the output of the first pressure regulator 20 the fuel pressure has reduced to a second pressure $P_3$ at a temperature $T_3$. The pressure $P_3$ in the preferred embodiment is 0.35 Kg/cm² which in the English system is 5 psig. Since the fuel is in equilibrium the temperature $T_3$ is approximately $-40°$ C. The temperature of the fuel is a temperature which is lower than the environment in which the engine 8 may typically be found. As will be shown, it is necessary that the temperature of the fuel at the output of the first pressure regulator 20 must be such that at cold starts the fuel itself is capable of having its temperature elevated and not cooled down below the temperature $T_3$. The fuel output of the first pressure regulator 20 is passed through a heat exchanger and vaporizer 22, hereinafter sometimes called heat exchanger, where the equilibrium of the fuel is changed as its temperature is raised therefore causing boiling of the fuel to a vaporized gas.

The heat exchanger 22 is mounted directly onto and contiguous with the intake manifold 24 of the engine 8 and has as its source of heat the complete engine system and the mass of whole system which even at the coldest engine temperatures is at some temperature $T_2$ which is higher than the temperature $T_3$. The intake manifold 24 is cooled by the location of the heat exchanger 22 contiguous to the manifold 24 which assists in maintaining the fuel charge in the manifold 24 at a temperature which is cooler than it would be if the heat exchanger 22 were elsewhere. This cooler charge assists in increasing the performance of the engine 8. Additionally, through the heat exchanger 22, engine coolant is passed under control of a thermostat 26 such that the coolant will operate to raise the temperature of the fuel above $T_3$. The thermostat 26 operates to restrict the flow of coolant through the heat exchanger 22 during the times that the engine 8 is warmed up, or during warm starts.

Figure 6:
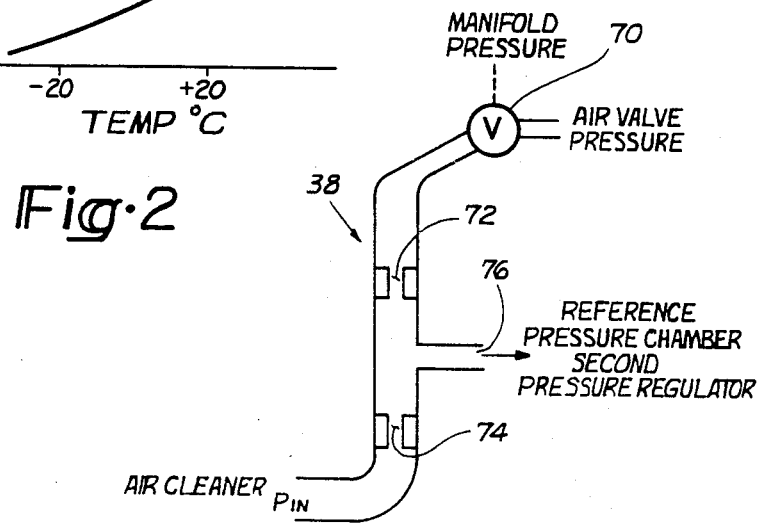
FIG. 6 is a schematic diagram of a vacuum pressure control for the low pressure regulator.

The vaporized fuel from output of the heat exchanger 22 is supplied to the vapor chamber 28 of a second pressure regulator 30. The pressure of the fuel is reduced to a third pressure $P_4$ which is much less than the pressure $P_3$. The second pressure regulator 30 has a reference pressure chamber 32 which may be vented at 34 to the inlet pressure 36 or in the alternative to a vacuum pressure regulator or controller 38 as shown in FIG. 6. In the preferred embodiment the pressure $P_4$ is $-2$ inches of water referenced to inlet air pressure ($P_{in}$) 36 which is approximately 0.005 Kg/cm$^2$. The fuel at the output of the heat exchanger 22 is a vaporized gas and is passed through a second metering valve 40 and discharged into the inlet or intake tube 42 of the engine 8 upstream of the throttle valve. Outside air is mixed with the fuel upstream of the throttle blade 14 and the air/fuel mixture to the engine 8 is at the appropriate desired air/fuel ratio as determined by the engine requirements. As is conventionally understood, the throttle blade 14 is operated by either the engine operator or may in some instances be under electronic control.

Figure 2:
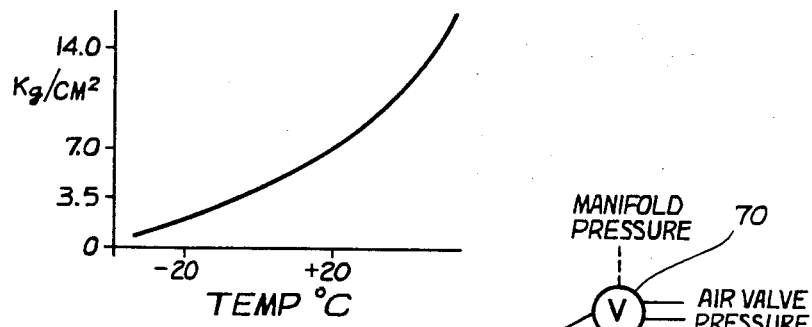
FIG. 2 is a graph illustrating the relationships between the fuel pressure and fuel temperature at saturated LPG.

Referring to FIG. 2, there is a graph of saturated propane vapor pressure versus temperature. As will be shown in conventional engine operating conditions, the temperature may be at approximately 65° F. or 18° C. and the fuel pressure will be at 100 psig or 7 Kg/cm$^2$. As the pressure of the fuel is reduced, the temperature of the fuel itself is reduced as long as the fuel remains saturated.

The theory of operation of the present invention is to use the intake manifold 24 of the engine 8 and the engine itself to heat the LPG to raise its temperature above the equilibrium temperature so that the fuel will boil from a liquid to a vapor. Due to the construction of the carburetor 12 of the present invention which is illustrated as a single bore carburetor but may be a multi-bore carburetor, the location of the heat exchanger 22 is such that it is contiguous with and mounted on the surface of the intake manifold 24 and therefore uses the whole thermal mass of the manifold 24 and the engine 8 as well as the carburetor 24 itself to function as a source of heat. Therefore, the thermal mass of the system, the coolant temperature of the water, and the conduction from the engine 8 itself are three sources of heat which are used under controlled conditions to change the temperature of the LPG such that it vaporizes. With such a system, it has been found that in a cold start condition going from a cold start to wide-open throttle acceleration, the change in temperature of the fuel at the initial operation is a change of 17° C. This indicates that if the engine 8 is cold soaked to a temperature of $-23°$ C. and the engine 8 is started with a wide-open throttle acceleration, the temperature of the fuel will be raised from $-40°$ C. to $-23°$ C. As the fuel is drawn into the engine 8, the fuel will drop temporarily down to $-40°$ C. which is no colder than the temperature $T_3$ at the output stage of the first pressure regulator 20. As the engine starts to run, the temperature of the fuel is warmed up thereby preventing any ice from forming around the throttle blade 14.

The use of the water or coolant chamber 60 in the heat exchanger 22 further operates to allow these particular cold start operations because the thermal mass of the water prevents the fuel from having a temperature change greater than, in the preferred embodiment, 17° C. at the wide-open throttle acceleration condition. This is in contrast to other systems wherein the fuel, under the same conditions, will have a temperature drop of 39° C. Therefore if the fuel coming into the system is at $-40°$ C. that means the system itself cannot be colder than $-1°$ C. or otherwise ice may form on the throttle blade 14 and the engine 8 will stall. More importantly, under these conditions the fuel will not be totally vaporized and liquid will pass through the metering valve 40. In short, if there is too much of a temperature drop, which drops the fuel temperature below $T_3$, the fuel will become liquid. In both situations, once the engine starts to run and the engine generates heat, the fuel temperature is raised such that the fuel will vaporize.

Referring to FIG. 3, there is a cross-section of a integral LPG carburetor 12, again, where the carburetor is used in a monofuel system. The carburetor 12 is bolted or fastened onto the manifold 24 such that it is contiguous thereto. Within the carburetor 12 is the throttle valve 14 and an air or first metering valve 10 connected to a fuel or second metering valve 40. LPG enters into the carburetor 12 at a port 44 near to or adjacent to the manifold 24 wherein it is controlled by the first pressure regulator valve 46. The output of the fuel from the first pressure regulator valve 46, as indicated in FIG. 1, is at a pressure $P_3$ which is at temperature $T_3$. This particular pressure and temperature in the present environment is a temperature of $-40°$ C. and a pressure of 0.35 Kg/cm$^2$. The fuel, still in liquid form, is routed, as shown by the arrows 48 and 49 through the heat exchanger 22 as shown in FIGS. 4 and 5. One side 52 of the fuel chamber 54 in the heat exchanger is adjacent to the manifold 24 of the system. The fuel flows through the heat exchanger, which may be a series of passageways 54 in a labryinth or spiral configuration such as illustrated by the arrows 48, 49 in FIGS. 4 and 5, where the fuel is vaporized and is fed through piping or passageway 56 to the second pressure regulator 30 upstream of the throttle valve 14. FIGS. 4 and 5 illustrate the configuration of the two levels of the preferred embodiment of the heat exchanger 22 where the levels are connected by a vertical passageway 58.

As previously indicated, the heat exchanger 22 has an inner core or chamber 60 which is supplied by coolant from the engine 8 for the purposes of extremely cold starts. As shown in FIG. 1, the coolant is controlled by a thermostat 26 preventing the flow of coolant when the engine 8 starts to warm up. This is a closed loop coolant system wherein the engine coolant passes through the heat exchanger 22 and returns to the engine 8. Once the engine 8 is running, the thermostat 26 will close preventing the flow of coolant through the heat exchanger 22.

The position of the heat exchanger 22 contiguous to the intake manifold 24 provides to the fuel a large thermal mass comprising not only the intake manifold 24 but the complete engine 8. As previously indicated, the fuel is liquid as it enters, as shown by the arrow 48, the heat exchanger 22 at a temperature of $-40°$ C. The environment in which the engine 8, if it is an automotive engine, is to be operated would be at least $-29°$ C. This will give a temperature difference across the heat exchanger manifold barrier 52 of 11° C. This 11° C. difference will cause the liquid fuel to boil and vaporize as it flows through the passageways 54 in the heat exchanger 22 in the carburetor 12. If the coolant is protected so that it is not frozen, then its temperature is likewise above the temperature of the fuel and it also acts as a source of heat to vaporize the fuel. The vaporized fuel is supplied through a passageway 56 to the second pressure regulator 30 which is typically mounted in the air cleaner 62 above the throttle blade 14.

The second or low pressure regulator 30 is set to reduce the pressure of the vaporized fuel to a pressure slightly below atmospheric in order to effectively regulate the pressure and to provide a pressure differential causing the fuel to flow. This pressure differential will be explained hereafter. Fuel is then supplied from the low pressure regulator 30 through a second or fuel metering valve 40 which is a butterfly valve directly connected to an air metering valve 10 for synchronous movement therewith. Depending upon the lengths of the various levers connected between the two metering valves 10 and 40, the openings may not be equal but the motion of valve movements will be synchronous.

As shown in FIG. 3, the orientation of the carburetor is such that it discourages the flow of liquid as opposed to vapor from the first pressure regulator 20 to the second pressure regulator 30. However, if LPG in liquid form should flow into the second pressure regulator 30, a dam 64 is provided to keep liquid fuel from flowing into the fuel metering valve 40. The object is to have only vaporized LPG flow into the intake 42 of the engine 8.

The air metering valve 10 is contained within the throttle body of the engine 8 and upstream of the throttle valve 14 wherein the air is brought in from the outside through the air cleaner 62 past the air metering valve 10 down into the engine 8 past the throttle valve 14. The air metering valve 10 in the preferred embodiment is driven by a vacuum motor 66 responsive to the pressure or vacuum in the carburetor 12 between the throttle valve 14 and the air metering valve 10. This pressure is called the air valve pressure and the air metering valve 10 opening is proportional to the intake airflow.

The throttle valve 14 is controlled by the engine operator and is the main indication to the engine 8 of the amount of fuel which is necessary. As the throttle valve 14 is rotated so as to open and as the engine 8 is started, the heavy vacuum in the manifold 24 is allowed to move into the space between the air metering valve 10 and the throttle valve 14. This air valve pressure causes the vacuum motor 66 to operate opening the air metering valve to a predetermined distance to maintain a predetermined pressure drop across the air metering valve 10.

The operation of the vacuum motor 66 and the air metering valve 10 is such as to maintain the desired air/fuel ratios in the system. As previously indicated, the air metering valve 10 and the fuel metering valve 40 are operatively connected together so as the air metering valve 10 rotates so does the fuel metering valve 40. Thus the fuel is metered in proportion to airflow. Fuel is supplied from the low pressure regulator 30 past the fuel metering valve 40 and out through a discharge tube 68 into the space between the air metering valve 10 and the throttle valve 14. Fuel in this space is then mixed with the incoming air at the proper ratio as it passes the throttle valve 14 into the various cylinders of the engine 8.

Referring to FIG. 6, there is illustrated in schematic form a vacuum pressure regulator or controller 38 for the low pressure regulator 30. The purpose of the controller 38 is to control the air/fuel ratio at different throttle positions and engine loads. In the particular embodiment illustrated, the output pressure to the upper of the reference pressure chamber 32 of the second or low pressure regulator 30 is either one of two values. The valve 20 illustrated is a vacuum operated valve actuated by the pressure found in the engine manifold 24. The valve 20 is an open-close valve which in the preferred embodiment is closed at wide open throttle, WOT, and open at part throttle. It is obvious that the valve can be actuated by other means such as hydraulics, electromagnetic means, electromechanical means, etc.

Illustrated in FIG. 6 is the preferred embodiment of controller 38 having at least two orifices 72, 74 sized to control the pressure at the output port 76. When the valve 70 is closed signifying WOT condition, there is no flow in the controller 38 and the pressure in the upper chamber or reference pressure chamber 32 of low pressure regulator 30 is equal to the inlet pressure ($P_{in}$). When the valve 70 is open, there is flow through the two orifices 72, 74 with the resulting pressure drops so that effective pressure of the fuel $P_4$ is more negative. The plot of air/fuel ratio against air flow is essentially smooth and parallel at the two different manifold pressure, i.e., WOT and part throttle.

In the actual embodiment, the vacuum pressure control unit 38 is integral with the carburetor 12 and the output port 76 is connected to the pressure source input 34 on the low pressure regulator 30. Inlet pressure ($P_{in}$) is taken from the air cleaner 62 after the ambient air has passed through the air cleaner element 78. The second source of pressure which is controlled by the valve 70 is the same source as operates the air valve vacuum motor 66 and the valve 70 is interposed the air valve pressure and the orifices 72, 74 in the controller 38.

It has been determined that there is a pressure drop across the air metering valve 10 which is on the order of 8–10 inches of water and with the pressure $P_4$ of the fuel out of the low pressure regulator at $-2$ inches of water. This creates a pressure differential across the fuel metering valve 40 such that the fuel will flow through the metering valve 40 the discharge tube 68 into the intake tube 42.

As indicated earlier, there is an alternate form of heating the fuel by means of the engine coolant passing through the heat exchanger 22. The coolant is controlled by a thermostat 26 such that as the temperature of the coolant increases to a point, the thermostat 26 will close stopping the flow of the coolant through the heat exchanger 22. The positioning of the coolant chamber 60 in the heat exchanger 22 relative to the throttle valve 14 is important as the coolant will keep the throttle valve 14 deiced under extreme temperature conditions. It is for this reason that the coolant chamber 60 encircles the throttle valve 14.

The descriptions of operation of the pressure regulators are conventional and, more particularly, the low pressure regulator 30 is a diaphragm 80 pressure regulator wherein inlet pressure is in the upper chamber 32 above the diaphragm 80 relative to the Figure and the regulated pressure of the vapor is in the lower chamber 28 below the diaphragm. The valve 82 is operated to allow the vapor to flow into the low pressure chamber 28 in accordance with the pressure therein.

Surrounding the low pressure regulator is the air cleaner 62 including a cover for the system thereby keeping the air relatively clean from dirt, not only for the operation of low pressure regulator 30, but for the air being supplied into the engine 8.

By the present system, the air/fuel ratio is variable and is under the control of the air metering valve 10 and the throttle valve 14 working together. In addition the air/fuel ratio is controlled by changing the reference pressure in the upper chamber 32 of the low pressure regulator 30. This is in contrast to other systems wherein the air/fuel ratio is not variable.

What is claimed is:

1. A liquified petroleum gas carburetor for an internal combustion engine supplied from a tank with an outlet and containing source of liquified petroleum gas maintained at a pressure ($P_1$) wherein the gas is in an equilibrium state, and having a throttle valve in the intake tube controlling the amount of the air fuel charge ingested by the engine through the intake manifold, the carburetor characterized by:
   a heat exchanger adaptable to be mounted contiguous with the intake manifold and surrounding the intake tube for receiving the liquified petroleum gas in the equilibrium state and discharging liquified petroleum gas in a vaporized state;
   a first pressure regulator coupled to the outlet of the tank and integral with said heat exchanger to receive the liquified petroleum gas in the equilibrium state and regulate the pressure of the liquified petroleum gas to a second pressure ($P_3$);
   a second pressure regulator coupled to the output of said heat exchanger and upstream therefrom, said second pressure regulator in the air flow to the throttle valve for receiving said vaporized liquified petroleum gas and regulating its pressure to a third pressure ($P_4$); and
   a metering valve coupled to said second pressure regulator for discharging said vaporized liquified petroleum gas into the intake tube in response to engine requirements for mixing said vaporized liquified petroleum gas with the flow of air.

2. A liquified petroleum gas carburetor according to claim 1 wherein said heat exchanger has an engine coolant chamber encircling the throttle valve.

3. A liquified petroleum gas carburetor according to claim 2 wherein the coolant in said coolant chamber is controlled by a thermostat preventing coolant flow during warm engine conditions.

4. A liquified petroleum gas carburetor according to claim 1 additionally including a second metering valve upstream from said throttle valve for metering the flow of air in the intake tube wherein said first and second metering movements are synchronous.

5. A liquified petroleum gas carburetor according to claim 1 wherein said second pressure regulator additionally includes a vacuum pressure controller operable in response to the engine conditions for controlling the reference pressure to the reference chamber of said second pressure regulator for varying the air/fuel ratio ingested by the engine.

6. A liquified petroleum gas carburetor according to claim 5 wherein said vacuum pressure controller comprises at least two inline orifices, a source of inlet pressure ($P_{in}$) connected to the first of said orifices, an outlet port intermediate said orifices, a valve responding to engine conditions for connecting a source of vacuum to the last of said orifices for varying the pressure at said outlet port.

7. A liquified petroleum gas carburetor according to claim 1 wherein said second pressure of the liquified petroleum gas is regulated to approximately 0.35 Kg/cm$^2$ (5 PSIG).

8. A method for metering liquified petroleum gas through a carburetor into an internal combustion engine comprising the steps of:
   maintaining a source of liquified petroleum gas in a pressure-temperature equilibrium where said gas is a liquid;
   removing said gas from said source;
   introducing said gas into the carburetor;
   reducing the pressure of said gas to a second pressure that is lower than the pressure at its source maintaining said gas as a liquid;
   cooling the intake manifold by vaporizing the gas in a chamber contiguous to the intake manifold and encircling the input tube of the engine;
   reducing the pressure of the vaporized gas to a third pressure;
   metering the flow of air into the intake tube of the engine;
   metering the vaporized gas into the intake tube of the engine, and then
   mixing the vaporized gas with a predetermined amount of air forming a fuel charge in the intake tube of the internal combustion engine.

9. The method of claim 8 wherein said step of reducing the pressure includes the step of generating a reference pressure varying with the engine condition.

10. The method of claim 8 wherein the steps of metering the flow of air and metering the vaporized gas are performed synchronously.

* * * * *